United States Patent
Schneider

(10) Patent No.: US 10,787,991 B2
(45) Date of Patent: Sep. 29, 2020

(54) COMPLEX-SHAPED FORGED PISTON OIL GALLERIES

(71) Applicant: Federal-Mogul Corporation, Southfield, MI (US)

(72) Inventor: Norbert G. Schneider, Ann Arbor, MI (US)

(73) Assignee: Tenneco Inc., Lake Forest, IL (US)

( * ) Notice: Subject to any disclaimer, the term of this patent is extended or adjusted under 35 U.S.C. 154(b) by 301 days.

(21) Appl. No.: 15/078,813

(22) Filed: Mar. 23, 2016

(65) Prior Publication Data

US 2016/0208735 A1 Jul. 21, 2016

Related U.S. Application Data

(63) Continuation of application No. 13/769,751, filed on Feb. 18, 2013, now Pat. No. 9,334,958.

(51) Int. Cl.
*F02F 3/22* (2006.01)
*B21K 1/18* (2006.01)
(Continued)

(52) U.S. Cl.
CPC ................ *F02F 3/22* (2013.01); *B21K 1/185* (2013.01); *F02B 23/0672* (2013.01); *F02F 3/26* (2013.01);
(Continued)

(58) Field of Classification Search
CPC .............. B21K 1/185; F02F 2003/0061; F02F 2200/04; F02F 3/22; F02F 3/26;
(Continued)

(56) References Cited

U.S. PATENT DOCUMENTS

| 4,581,983 A | 4/1986 | Moebus |
| 4,721,080 A * | 1/1988 | Moriyasu ................ F02B 23/06 |
| | | 123/256 |

(Continued)

FOREIGN PATENT DOCUMENTS

| CN | 1685143 A | 10/2005 |
| CN | 101365559 A | 2/2009 |

(Continued)

OTHER PUBLICATIONS

International Search Report, dated Jul. 3, 2017 (PCT/US2017/023501).

*Primary Examiner* — Lindsay M Low
*Assistant Examiner* — Ruben Picon-Feliciano
(74) *Attorney, Agent, or Firm* — Robert L. Stearns; Dickinson Wright, PLLC

(57) ABSTRACT

A piston for an internal combustion engine including a cooling gallery and a complex combustion surface is provided. The piston includes an upper crown member joined to a lower member, for example by hybrid induction welding. A complex combustion bowl is formed in the upper crown member by forging. The combustion bowl includes at least one protrusion, and typically a plurality of protrusions spaced from one another. After the forging step and before the joining step, portions of an undercrown surface located opposite the spaces between the protrusions are machined, and portions located directly opposite the protrusions are left as-forged. The crown member is joined to the lower member, for example by hybrid induction welding.

4 Claims, 6 Drawing Sheets

(51) Int. Cl.
*F16J 1/08* (2006.01)
*F02F 3/26* (2006.01)
*F16J 1/09* (2006.01)
*F02B 23/06* (2006.01)
*F02F 3/00* (2006.01)

(52) U.S. Cl.
CPC . *F16J 1/08* (2013.01); *F16J 1/09* (2013.01); *F02F 2003/0061* (2013.01); *F02F 2200/04* (2013.01); *F05C 2201/0448* (2013.01); *Y02T 10/125* (2013.01); *Y10T 29/49249* (2015.01)

(58) Field of Classification Search
CPC ........ F05C 2201/0448; F16J 1/08; F16J 1/09; F02B 23/0672; Y02T 10/125; Y10T 29/49249
See application file for complete search history.

(56) References Cited

U.S. PATENT DOCUMENTS

| | | | |
|---|---|---|---|
| 4,867,119 A | 9/1989 | Cooper et al. | |
| 5,245,752 A | 9/1993 | Lippai et al. | |
| 6,286,477 B1 | 9/2001 | Yang et al. | |
| 6,474,220 B2 | 11/2002 | Ries | |
| 6,588,396 B1 | 7/2003 | Cleary et al. | |
| 6,698,391 B1 | 3/2004 | Kemnitz | |
| 6,698,392 B1 | 3/2004 | Koehnert et al. | |
| 6,928,997 B2 | 8/2005 | Yu | |
| 6,938,603 B2 | 9/2005 | Scharp | |
| 7,005,620 B2 | 2/2006 | Ribeiro et al. | |
| 7,104,183 B2 | 9/2006 | Huang | |
| 7,185,614 B2 | 3/2007 | Meffert et al. | |
| 7,318,406 B2 | 1/2008 | Yi et al. | |
| 7,380,536 B2 | 6/2008 | Issler | |
| 7,971,568 B2 | 7/2011 | Lee | |
| 7,987,831 B2 | 8/2011 | Seifried | |
| 8,528,206 B2 * | 9/2013 | Scharp | B21K 1/185 123/193.6 |
| 8,789,273 B2 | 7/2014 | Janssen | |
| 8,807,109 B2 * | 8/2014 | Muscas | F02F 3/003 123/193.6 |
| 8,943,687 B2 | 2/2015 | Scharp et al. | |
| 2003/0075137 A1 | 4/2003 | Gaiser | |
| 2005/0172926 A1 | 8/2005 | Poola et al. | |
| 2006/0207424 A1 * | 9/2006 | Gaiser | F02F 3/003 92/222 |
| 2008/0127818 A1 | 6/2008 | Dye | |
| 2010/0218673 A1 | 9/2010 | Ribeiro | |
| 2010/0299922 A1 | 12/2010 | Gniesmer et al. | |
| 2011/0185889 A1 * | 8/2011 | Muscas | F02F 3/003 92/158 |
| 2012/0222304 A1 * | 9/2012 | Scharp | B21K 1/185 29/888.042 |
| 2012/2222305 | 9/2012 | Scharp et al. | |
| 2012/0260882 A1 * | 10/2012 | Martins | B23B 1/00 123/193.6 |
| 2014/0230646 A1 | 8/2014 | Schneider | |

FOREIGN PATENT DOCUMENTS

| | | | |
|---|---|---|---|
| CN | 101472705 | | 7/2009 |
| CN | 102395819 | | 3/2012 |
| CN | 202348466 U | | 7/2012 |
| CN | 102667124 A | | 9/2012 |
| DE | 102008011922 A1 | | 9/2009 |
| EP | 2489848 A2 | | 8/2012 |
| GB | 768992 A | | 2/1957 |
| JP | H03502720 A | | 6/1991 |
| JP | 2005520082 A | | 7/2005 |
| JP | 2006500505 A | | 1/2006 |
| JP | 2007270812 A | | 10/2007 |
| WO | 2011097205 A2 | | 8/2011 |
| WO | 2014126736 A1 | | 8/2014 |
| WO | WO-2014126736 A1 * | 8/2014 | ................ F16J 1/08 |

* cited by examiner

COMPLEX-SHAPED FORGED PISTON OIL GALLERIES

CROSS-REFERENCE TO RELATED APPLICATION

This U.S. Continuation-In-Part Application claims the benefit of U.S. Utility patent application Ser. No. 13/769,751, filed Feb. 18, 2013, which is incorporated herein by reference in its entirety.

TECHNICAL FIELD

The invention relates generally to pistons for internal combustion engines, particularly diesel engines, and more particularly to pistons having oil galleries.

BACKGROUND

It is known in internal combustion engine applications, particularly with respect to diesel engines, to provide pistons with bodies formed with a closed gallery for cooling oil. The oil circulates through the gallery and cools parts of the piston which are susceptible to damage from the heat of combustion. The outer rim around the combustion bowl of the piston is particularly susceptible to damage when overheated.

The cooling galleries are generally annular or ring-shaped with constant cross-sections and are provided inside the piston ring belt and adjacent the top wall and outer rim of the piston body. The gallery is bounded by an inner wall adjacent the combustion bowl. The oil galleries can be either open or closed. If closed, the gallery channel is closed at the bottom by a bottom wall. For closed galleries, inlets can be provided in the bottom wall for receiving cooling oil into the gallery, or the cooling oil could be supplied to the galleries by other means.

Traditionally, the combustion bowls of diesel engines have circular symmetric shapes and have smooth unbroken surfaces from the outer rims to the depressed center portions. Today, however, new bowls are being designed with non-traditional or complex shapes. It is understood that these non-traditional shapes are utilized in order to burn fuel more effectively and with less undesirable emissions. However, the complex bowl shapes makes the cooling of the bowls and outer rims with conventional piston galleries more difficult. Conventional machining with turning operations will not provide oil galleries with similar or corresponding complex shapes as the complex shaped combustion bowls.

If the differences in structure between the combustion bowls and the oil galleries create walls with significantly different thicknesses, or walls which are too thick to be adequately cooled by the oil being circulated in the oil galleries, then "hot spots" in the piston can occur where the material can overheat. Hot spot areas can create weak spots in the piston where the material could crack or fail. If a piston fails, this creates an engine failure causing major expense and perhaps a new engine for the vehicle.

SUMMARY OF THE INVENTION

One aspect of the invention provides a piston for an internal combustion engine formed with a complex combustion bowl design to reduce overheating concerns. The piston includes an upper portion of a ring belt depending from the outer rim, and a combustion bowl depending inwardly from the outer rim opposite the ring belt. The combustion bowl includes at least one protrusion, and typically a plurality of protrusions spaced from one another circumferentially about the center axis. A lower member of the piston includes a lower portion of the ring belt joined to the upper portion of the ring belt. The lower member also includes side walls depending from the ring belt, and the side walls are spaced from one another by pin bosses presenting a pin bore.

Another aspect of the invention provides a method of manufacturing a piston. The method includes providing an upper crown member including an outer rim extending circumferentially around a center axis, a combustion bowl depending inwardly from the outer rim, and an upper portion of a ring belt depending from the outer rim opposite the combustion bowl. The combustion bowl includes at least one protrusion. The method further includes providing a lower member including a lower portion of the ring belt and side walls depending from the ring belt, the side walls being spaced from one another by pin bosses presenting a pin bore; and joining the lower portion of the ring belt to the upper portion of the ring belt.

BRIEF DESCRIPTION OF THE DRAWINGS

These and other features and advantages of the present invention will become more readily appreciated when considered in connection with the following detailed description and appending drawings, wherein.

DETAILED DESCRIPTION

Figure 1:
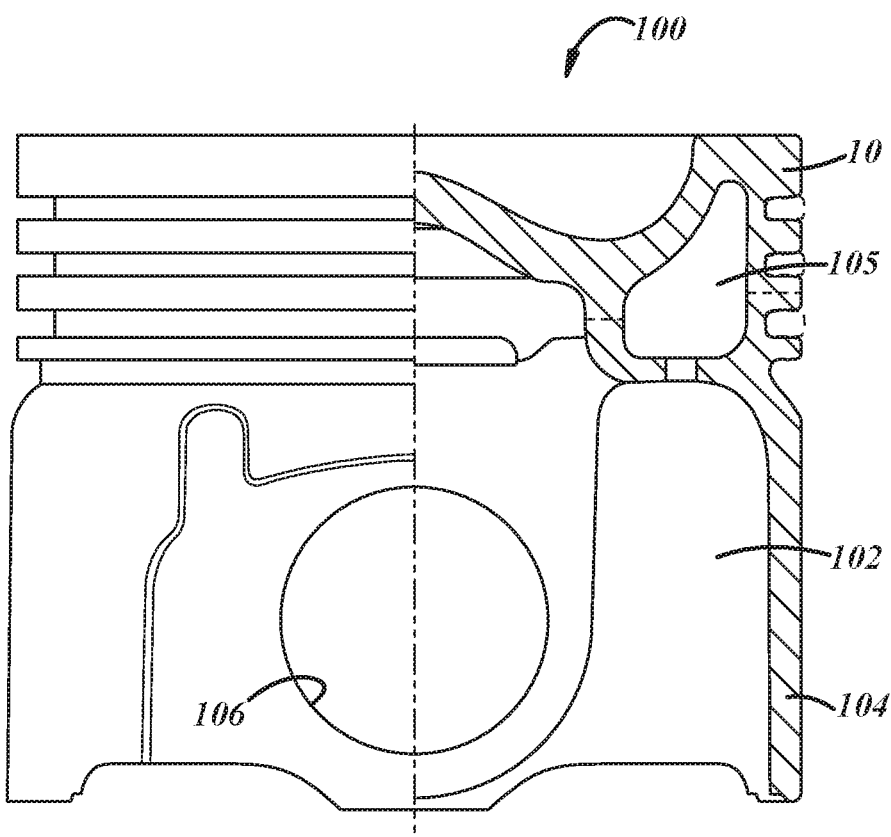
FIG. 1 illustrates a piston with a closed oil gallery according to one example embodiment.

A representative piston 100 in which the present invention can be utilized if the combustion bowl has a complex shape is shown in FIG. 1. The piston 100 includes a piston crown member 10 and a lower member 102 which includes sidewalls 104 and pin bosses 106. The piston crown 10 and lower member 102 are fixedly secured together, preferably by friction welding, to form the complete piston 100.

The piston 100 has an oil gallery in which oil is circulated in order to maintain the temperature of the piston, particularly the upper surface, combustion bowl and outer rim within acceptable temperature limits. The oil gallery includes an oil gallery channel 105 positioned in the crown member 10. The oil gallery can be either opened or closed as well known in the art. If closed, the bottom wall of the oil gallery is typically included as part of the lower member 102.

Figure 3:
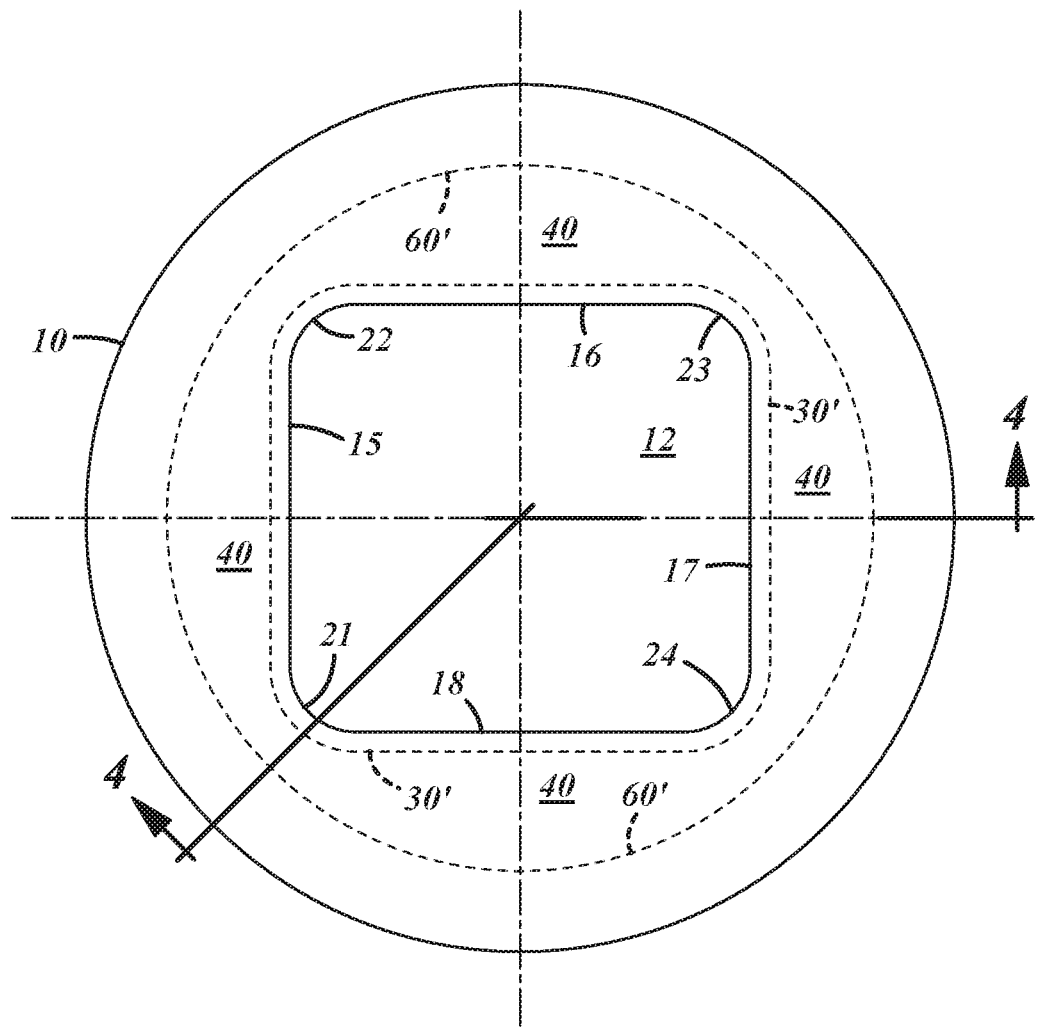
FIG. 3 is a schematic plan view of a piston crown depicting a representative complex shape of a combustion bowl.

A piston crown member 10 with a representative complex combustion bowl 12 is depicted in FIG. 3. The shape of the bowl 12 is essentially a square shape with four sides 15, 16, 17 and 18. In the shape depicted, the sides are straight with rounded corners 21, 22, 23 and 24.

It is to be understood that the shape of the combustion bowl and the linearity of the sides 15-18 is merely one example of a complex combustion bowl. In accordance with the invention, the combustion bowl can have any perimeter or internal shape, with any number of sides or side portions. The sides and internal surfaces can also have any shape, such as being straight as shown or curved or arced, and can have sections or portions which are straight, curved or arced, or have bumps, protrusions, recesses, ribs and the like. In addition, the corners 21-24, or the intersections or joints between the side portions, can have any shape, and can protrude into the bowl or be recessed from it.

Figure 2A:
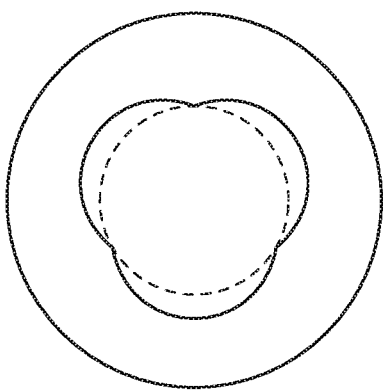
FIGS. 2A, 2B and 2C schematically illustrate three examples of complex combustion bowls.
Figure 2B:
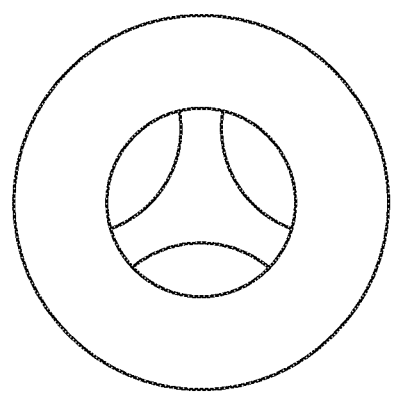
Figure 2C:
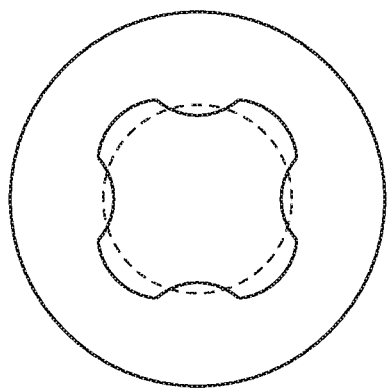

The shape of the piston bowl can be complex either in its outer periphery, as shown in FIG. 2A, be complex in the radially inner areas of the bowl, as shown in FIG. 2B, or be complex with respect to both the outer periphery and the inner areas as shown in FIG. 2C. FIGS. 2A, 2B and 2C are representative of these three general types of complex shaped combustion bowls. The present invention provides an oil gallery and oil gallery channel that can accommodate combustion bowls with such complex shapes.

The piston crown and the entire piston are made of a steel material. The shape of the piston crown 10 is formed by a forging process.

In accordance with an example embodiment of the invention, the oil gallery channel in the piston crown is made by the same process as the combustion bowl, or portions thereof In the embodiment shown, the oil gallery channel is made by a forging process, followed by a machining process.

In accordance with an example embodiment, the forging die for forming the combustion bowl and the forging die for forming the oil gallery channel have corresponding shapes. The two dies have similar straight sections and similar curved sections that correspond to one another.

Figure 4:
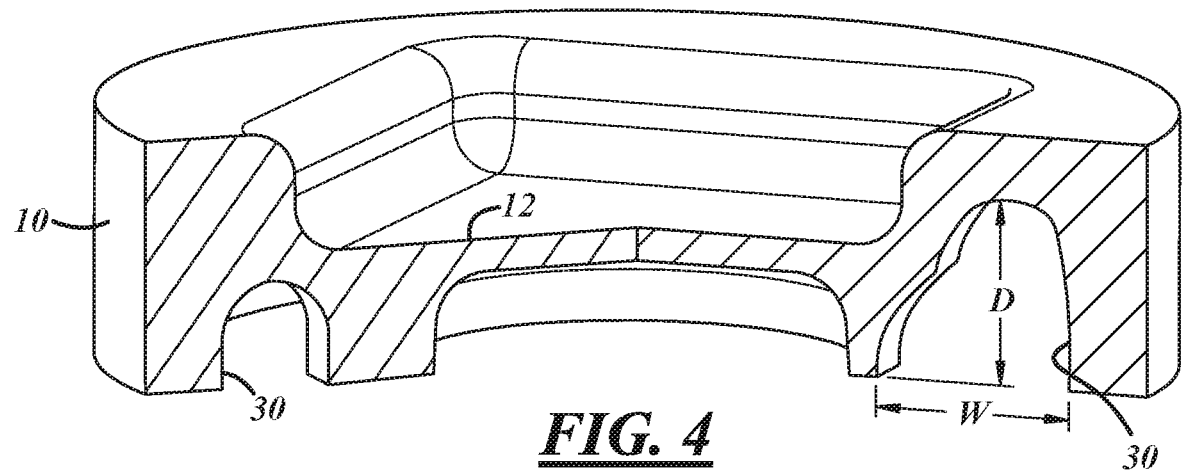
FIG. 4 is a cross-section of the piston crown as shown in FIG. 1 taken along line 4-4 and in direction of the arrows.

A cross-section of the piston crown 10 after the forging process is shown in FIG. 4. The forging process forms an annular groove 30 that does not necessarily have a circumferential uniform width "W" or a uniform depth "D". The width of the groove 30 is greater in the portions where the sides of the combustion bowl are furthest from the outside surface of the piston crown. These areas are designated by the numeral 40 in FIG. 3. Similarly, the areas where the groove 30 is the narrowest is at the corners or intersections between the side portions.

The depth D of the groove 30 made by the forging is dependent on the dies used in the forging process. There is a practical limit to the depth that forging dies can penetrate in a steel crown member and still be used repeatedly before they need replacing or refurbishing.

Figure 5:
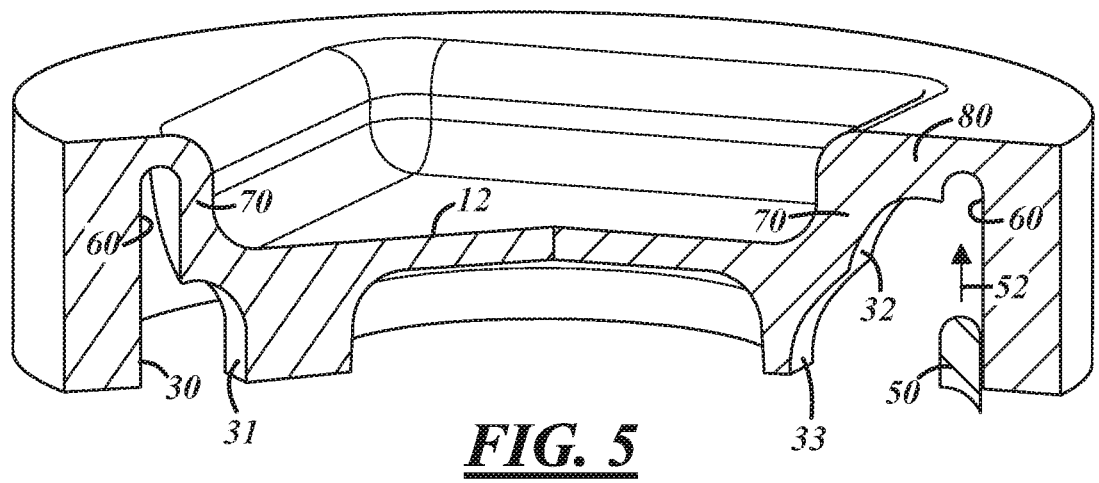
FIG. 5 is another cross-section of the piston crown similar to FIG. 4, following machining-turning of at least one surface of the oil gallery.

As a subsequent step in forming the oil galleries in accordance with an example embodiment of the invention, the shape of the oil gallery is machined to the shape shown in FIG. 5. In one step in the machine processing, a machining tool represented by the member 50 is inserted into the oil gallery 30 formed by the forging process (in the direction of arrow 52) and used to finish the outer surface of the oil gallery channel and to form an annular groove 60, entirely around the bowl. This machine-turning extends the oil gallery channel into the upper reaches of the piston crown (near the top ring groove and adjacent the top face or outer rim 80 of the piston). The groove 60, which is fully machined, extends above the initial channel 30 made in the forging process.

"Machine-turning" or simply "turning" is a machining process in which a cutting tool, typically a non-rotary tool bit, moves linearly while the workpiece rotates, such as on a lathe. "Maching turning" can refer to such a cutting or finishing operation on either the internal surfaces or the external surfaces of a workpiece. In machining some of the surfaces of an oil gallery channel thereon, the machine-turning finishes or forms internal surfaces.

The machine-turning processing can also be used to machine and finish some of the inner surfaces of the oil gallery channel 30, such as surface 31. Due to the complex shape in the oil gallery in order to follow the complex shape of the combustion bowl, a plurality of bumps or recesses can be formed on the inside gallery surface by the forging die in the forging process. Due to the turning procedure used in the machining process, the recesses and areas between bumps are left unfinished (i.e. not machined) in this step. Inner gallery channel surfaces 32 and 33 in FIG. 5 are not finished and remain in their original condition after forging.

In FIG. 3, the outer circumference of the finished annular groove 60 is indicated by hidden line 60'. In addition, an inner finished surface of the complex shaped oil gallery (such as surface 31) is indicated by the hidden line 30'. The areas (e.g. recesses) left unfinished are indicated by the reference numerals 32 and 33 in FIG. 5. An oil gallery channel having the shape 30 shown in FIG. 4 can be formed by a forging die.

In a typical forging operation, the oil gallery channel in the lower surface of the piston crown member 10 will be formed at the same time that another forging die is forming the complex shaped combustion bowl on the upper surface or upper side of the piston crown member.

The inventive process provides an annular oil gallery for a piston which has a similar or substantially the same perimeter inner shape as the outer perimeter shape of a complex-shaped combustion bowl. This minimizes the thicknesses of the wall areas 70 between the oil gallery and combustion bowl 12 and makes the wall thicknesses around the outside of the combustion bowl uniform. Due to practical limits of the forging and machining processes, the thicknesses of all of the walls will not be exactly the same around the circumference of the combustion bowl. The present invention, however, makes the wall thickness 70 as thin and uniform as practical around the entire oil gallery. This allows oil introduced in the oil gallery when the piston is finished to maintain the temperature of the bowl wall surfaces and outer rim 80 within appropriate limits and avoids harmful hot spots.

With the present invention, thick wall sections which can create hot spots are minimized or eliminated. Areas of a piston which overheat (also called "hot spots") can create weak spots that could crack or fail. Failure of pistons in this manner could lead to expensive repairs, and possibly to the replacement of the engine.

Preferred cooling for a piston can be provided when the walls have a uniform thickness and are relatively thin. Pistons with thinner walls also have less weight which provides less strain on the engine. This results in better gas mileage and less harmful emissions.

Figure 6:
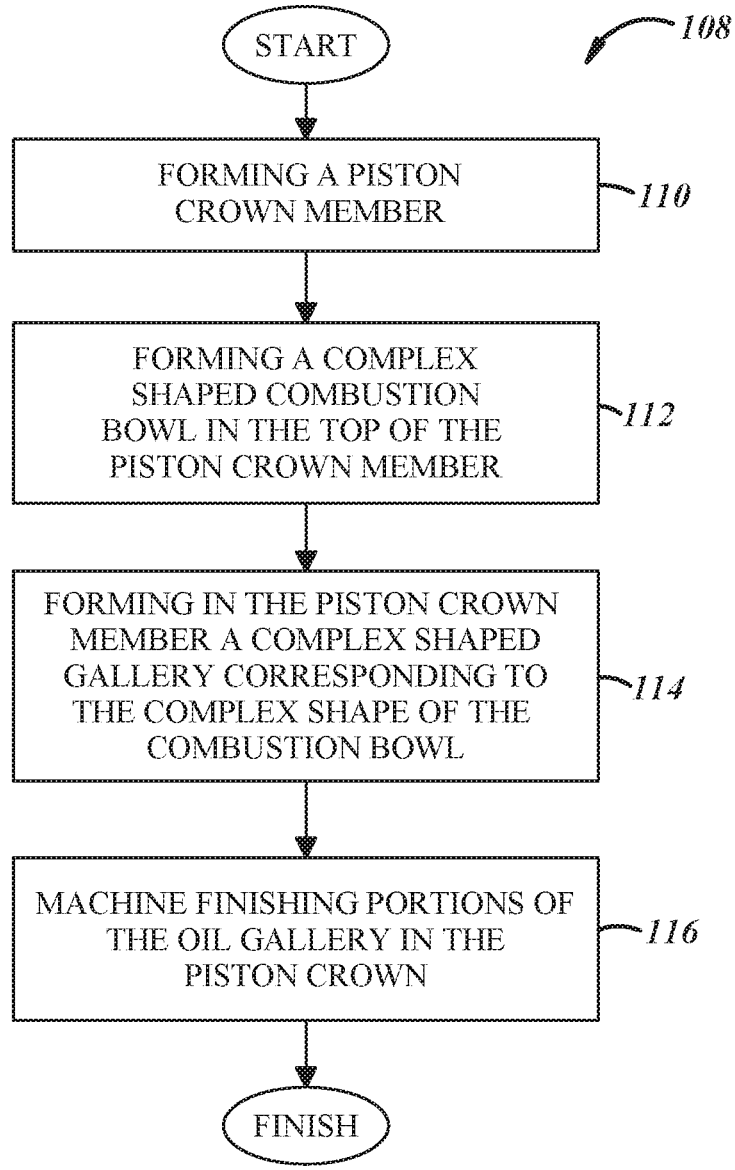
FIG. 6 is a flow chart of an embodiment of a system and method in accordance with the present invention.

FIG. 6 presents a flow chart 108 of an example method of forming an oil gallery channel in a piston crown that corresponds in shape to the shape of a complex combustion bowl in the piston crown. First, a piston crown member is made of a steel material 110. This can be done by any conventional manufacturing procedure.

Then, a complex shaped combustion bowl is formed in the top or upper surface of the piston crown member 112. This step is formed by a steel forging process.

At the same time or thereafter, an oil gallery channel 30 is formed in the lower surface or lower side of the piston crown member with a shape that is similar to, or corresponds to, the shape of the combustion bowl. This is shown in box 114. This step is also performed by a forging process, and preferably simultaneously with forging the bowl.

Finally, the oil gallery channel in the piston crown member is machine finished 116 to enlarge its size and bring it closer to the outer rim 80 of the piston crown member and the combustion bowl. In this step, an annular groove 60 is formed by a cutting tool, and the other surfaces of the gallery channel which can be finished by a machine-turning operation (i.e. other than recesses and areas between bumps) can be finished as desired.

Figure 7:
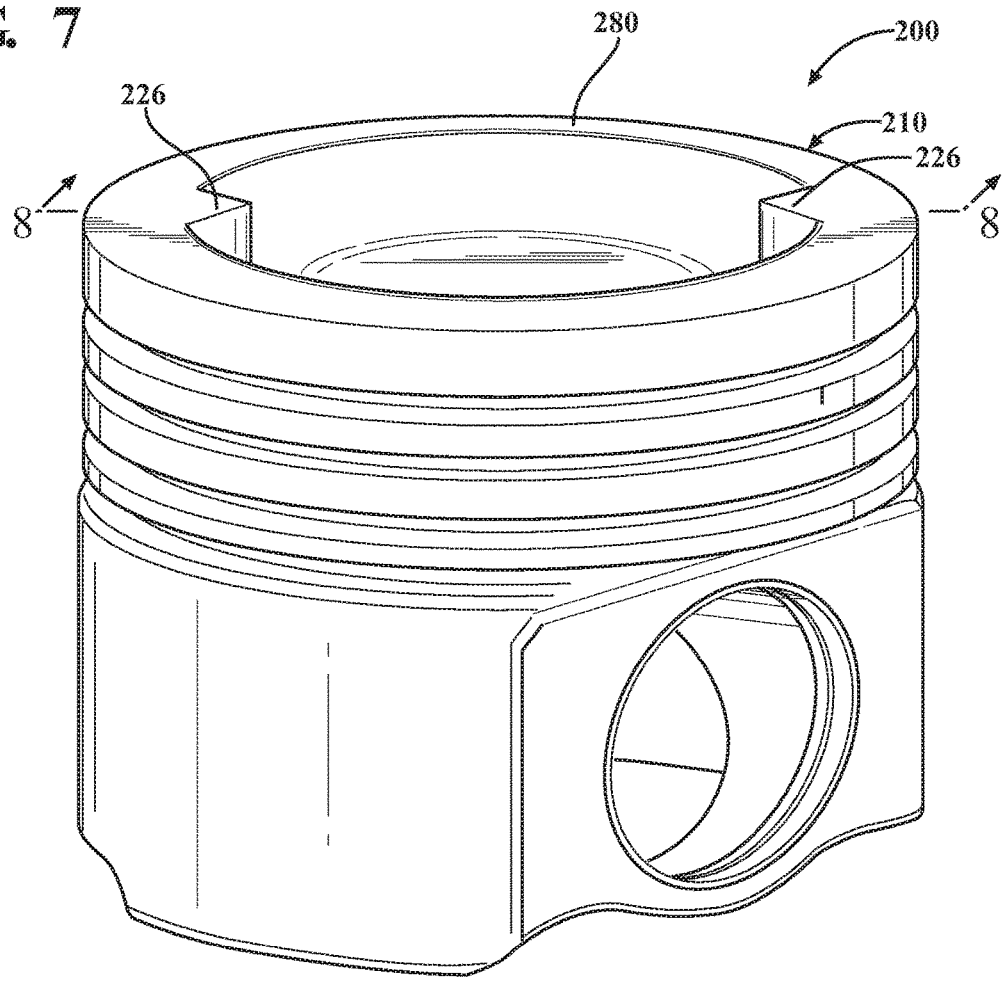
FIG. 7 is a perspective view of a piston including a combustion bowl with a complex shape according to another example embodiment.
Figure 8:
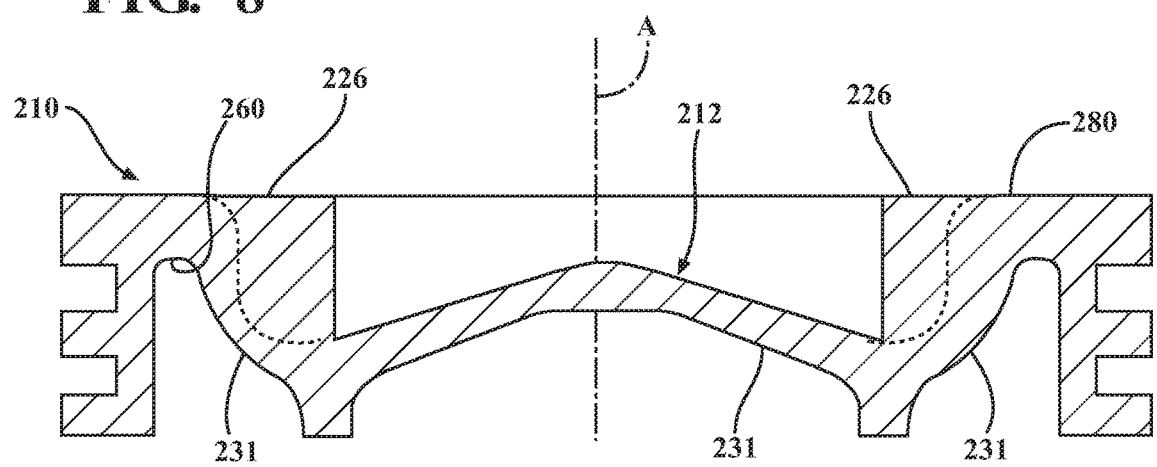
FIG. 8 is a cross-section of an upper crown member of the piston of FIG. 7 before joining to a lower member.
Figure 9:
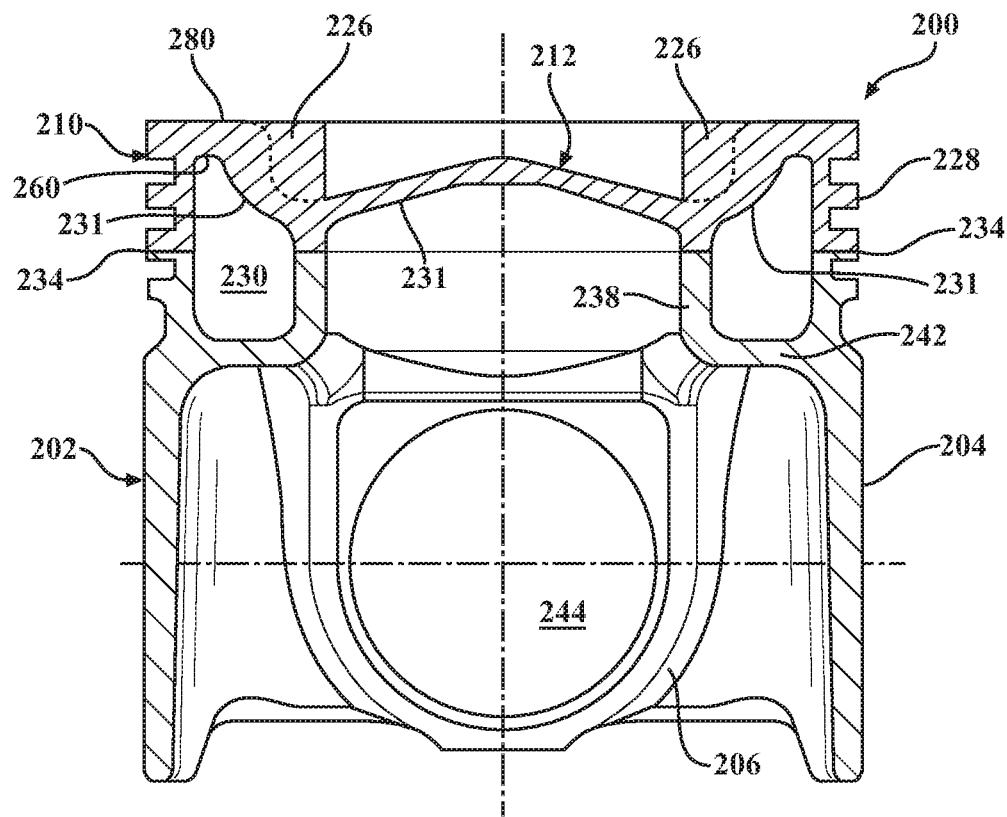
FIG. 9 is a cross-sectional view of the piston of FIG. 7 after joining the upper crown member to the lower member.

Another example piston 200 with the complex combustion bowl 212 is generally shown in FIGS. 7-9. The crown member 210 of the example piston 210 is manufactured by forging to create the complex combustion bowl 212. The crown member 210 includes an outer rim 280 extending circumferentially around a center axis. The combustion bowl 212 depends inwardly from the outer rim 280 and includes at least one protrusion 226 extending inwardly from the outer rim 280. In this example embodiment of FIGS. 7-9, the combustion bowl 212 includes a pair of protrusions 226 disposed opposite one another. Alternatively, the piston 200 can include a greater number of protrusions 226, for example four, five to eight, or up to ten protrusions 226 spaced from one another circumferentially along the outer rim 280. In the example embodiment, the protrusions 226 are equal in size, the protrusions 226 are spaced from one another by equal distances, and each protrusion 226 extends from the outer rim 280 to a base of the combustion bowl 212. However, the protrusions 226 could comprise different sizes and shapes, and could be spaced by non-equal distances. In the example embodiment of FIG. 7-9, the base of the combustion bowl 212 extends upwardly from the protrusions 226 to form an apex at the center axis. However, the combustion bowl 212 could comprise other shapes. The protrusions 226 of this example embodiment also present a sharp point between the outer rim 280 and the base of the combustion bowl 212, and the spaces between the protrusions 226 present a concave surface.

The crown member 210 further includes an undercrown surface 231 facing opposite the combustion bowl 212. Portions of the undercrown surface 231 located opposite the protrusions 226 are left in an as-forged condition, and portions of the undercrown surface 231 located opposite the spaces between the protrusions 226 are machined. The machined portions are those which will ultimately form a portion of the oil cooling gallery 230. An upper portion of a ring belt 228 including a plurality of ring grooves depends from the outer rim 280 opposite the combustion bowl 212. An upper portion of an inner rib 238 extends downward from the undercrown surface 231 and circumferential about the center axis. FIG. 8 is a cross-section of the crown member 210 before joining the crown member 210 to the lower member 202.

The lower member 202 of the example piston 200 of FIGS. 7-9 includes a lower portion of the ring belt 228 presenting a plurality of ring grooves and joined to the upper portion of the ring belt 228. The lower member 202 of the piston 200 also includes a lower portion of the inner rib 238 joined to the upper portion of the inner rib 238. In the example embodiment, hybrid induction welding is used to join the crown member 210 to the lower member 202. FIG. 9 is a cross-section of the crown member 210 and the lower member 202 after the joining step. However, other joining methods could be used, for example friction welding, laser welding, another welding technique, or gluing. The lower member 202 also includes the lower wall 242 extending from the ring belt 228 to the inner rib 238. The ring belt 228, lower wall 242, inner rib 238, and undercrown surface 231 together form a cooling gallery 230 therebetween which extends circumferentially around the center axis of the piston 200. The lower member 202 of the piston 200 also includes sidewalls 204 depending from the ring belt 228, and the sidewalls 204 are spaced from one another by intervening pin bosses 206. Each pin boss 206 is formed with a pin bore 244.

Figure 10:
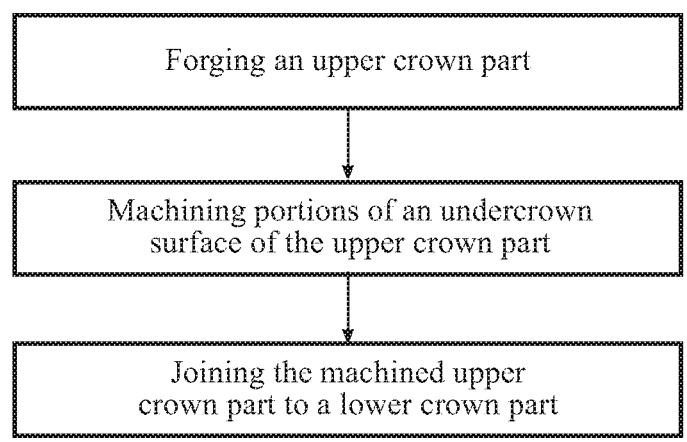
FIG. 10 is a flow chart of an example method used to form the piston of FIG. 7.

Another aspect of the invention provides a method of manufacturing the example piston 200 shown in FIGS. 7-9. FIG. 10 is a flow chart listing the general steps of manufacturing the piston 200 according to an example embodiment. In this example embodiment, the method begins by forging a metal material, such as steel, to form the upper crown member 210. The forging step includes forming the outer rim 280 and the combustion bowl 212 including the at least one protrusion 226, or plurality of protrusions 226 spaced from one another circumferentially along the outer rim 280. The upper crown member 210 is also forged to include the upper portion of the ring belt 228 depending from the outer rim 280 opposite the combustion bowl 212. According to the example embodiment, the forging step includes either hot forging at temperatures greater than 950° C. or warm forging at temperatures ranging from 750 to 950° C. Also according to the example embodiment, after forming the complex combustion bowl 212 during the forging step, no further machining of the combustion bowl 212 is conducted. However the outer rim 280 is partially machined, and the combustion bowl 212 could optionally be machined in some areas of the combustion bowl 212. The lower member 202 can be formed by forging, casting, or another method.

The method further includes machining portions of the undercrown surface 231 located opposite the combustion bowl 212 of the forged crown member 210 before joining the crown member 210 to the lower member 202. In the example embodiment, the method can include partial machining of portions of the undercrown surface 231 which will form the oil cooling gallery 230. Also, according to the example embodiment, the machined portions of the undercrown surface 231 are located opposite the spaces between the protrusions 226. Portions of the undercrown surface 231 located opposite the protrusions 226 are left as forged and unmachined. The method can also include machining the annular groove 260 around the piston 200. As shown in FIG. 9, the machined annular groove 260 is located adjacent the ring belt 228.

After the machining step, the method includes joining the upper crown member 210 to the lower member 202. The joining step includes joining the lower portion of the inner rib 238 to the upper portion of the inner rib 238, joining the upper portion of the ring belt 228 to the lower portion of the ring belt 228, and thus forming the cooling gallery 230 between the inner rib 238, the ring belt 228, the lower wall 242, and the undercrown surface 231.

The example method includes hybrid induction welding to join the upper crown member 210 to the lower member 202. The hybrid induction welding technique includes heating the members 202, 210 by induction, and rotating the members 202, 210 less than 360° relative to one another about the center axis immediately after joining. At the conclusion of the hybrid induction welding step, the at least one protrusion 226 or protrusions 226 are located in a specific location relative to the pin bore 244. However, the method of joining the crown to the lower member could alternatively include another welding technique, such as friction welding or laser welding, or gluing.

Although the invention has been described with respect to example embodiments, it is to be also understood that it is not to be so limited since changes and modifications can be made therein which are within the full scope of the following claims.

The invention claimed is:

1. A piston, comprising:
an upper crown member including an outer rim extending circumferentially around a center axis, an upper portion of a ring belt depending from the outer rim, a combustion bowl depending inwardly from the outer rim opposite the ring belt, the combustion bowl including a plurality of protrusions spaced from one another circumferentially about a center axis, each of the protrusions extending radially from the outer rim toward the center axis along a length of the protrusion, the length extending longitudinally from the outer rim to a base of the combustion bowl, the protrusions being equal in size and spaced from one another by equal distances, and each space between adjacent protrusions presenting a concave surface;
a lower member including a lower portion of the ring belt and side walls depending from the ring belt, the side walls being spaced from one another by pin bosses presenting a pin bore, and the lower portion of the ring belt being joined to the upper portion of the ring belt.

2. The piston of claim 1, wherein the upper crown member includes an undercrown surface opposite the combustion bowl, portions of the undercrown surface located opposite the protrusions are left in an as-forged condition, and portions of the undercrown surface located opposite the spaces between the protrusions are machined.

3. The piston of claim 1, wherein the base of the combustion bowl extends upwardly from the at least one protrusion to form an apex at the center axis of the piston.

4. A piston, comprising:
an upper crown member including an outer rim extending circumferentially around a center axis, an upper portion of a ring belt depending from the outer rim, a combustion bowl depending inwardly from the outer rim opposite the ring belt, the combustion bowl including at least one protrusion extending radially from the outer rim toward the center axis along a length of the at least one protrusion, the length extending longitudinally from the outer rim to a base of the combustion bowl, wherein the upper crown member includes an undercrown surface facing opposite the combustion bowl, the upper crown member includes an upper portion of an inner rib extending from the undercrown surface and circumferential about the center axis,
wherein the upper crown member includes a plurality of the protrusions spaced from one another circumferentially about the center axis, the protrusions are equal and size and are spaced from one another by equal distances, each protrusion extends from the outer rim to the base of the combustion bowl, the base of the combustion bowl extends upwardly from the protrusions to form an apex at the center axis, each space extending radially between the protrusions presents a concave surface, portions of the undercrown surface located opposite the protrusions are left in an as-forged condition, portions of the undercrown surface located opposite the spaces between the protrusions are machined;
a lower member including a lower portion of the ring belt and side walls depending from the ring belt, the side walls being spaced from one another by pin bosses presenting a pin bore, and the lower portion of the ring belt being joined to the upper portion of the ring belt, wherein the lower member includes a lower portion of the inner rib joined to the upper portion of the inner rib, the lower member includes a lower wall extending from the lower portion of the ring belt to the lower portion of the inner rib, and the inner rib and the ring belt and the lower wall and the undercrown surface define a cooling gallery therebetween.

\* \* \* \* \*